United States Patent [19]
Fulberth et al.

[11] 3,835,221
[45] Sept. 10, 1974

[54] ORALLY ADMINISTRABLE DRUG DOSAGE FORM HAVING DELAYED ACTION

[75] Inventors: Werner Fulberth, Kelkheim, Taunus; Erika Neitzer, Frankfurt am Main, both of Germany

[73] Assignee: Farbwerke Hoechst Aktiengesellschaft vormals Meister Lucius & Bruning, Frankfurt/Main, Germany

[22] Filed: Mar. 4, 1971

[21] Appl. No.: 121,173

[30] Foreign Application Priority Data
Mar. 5, 1970 Germany............................ 2010416

[52] U.S. Cl................. 424/20, 424/19, 424/22, 424/31, 424/32, 424/33, 424/35
[51] Int. Cl............................................. A61k 27/12
[58] Field of Search.......................... 424/19–22, 424/31, 32, 33, 35

[56] References Cited
UNITED STATES PATENTS

| | | | |
|---|---|---|---|
| 2,410,417 | 11/1946 | Andersen | 424/21 X R |
| 2,702,264 | 2/1955 | Klaui | 424/33 |
| 2,811,483 | 10/1957 | Aterno et al. | 424/21 X R |
| 2,853,420 | 9/1958 | Lowby | 424/35 X R |
| 2,928,770 | 3/1960 | Bardani | 424/21 |
| 3,096,248 | 7/1963 | Rudzki | 424/35 X R |
| 3,247,066 | 4/1966 | Milosovich | 424/35 X R |
| 3,325,365 | 6/1967 | Hotko et al. | 424/33 |
| 3,371,015 | 2/1968 | Sjogren et al. | 424/35 X R |
| 3,420,931 | 1/1969 | Daum et al. | 424/33 |
| 3,538,214 | 11/1970 | Polli et al. | 424/19 |

*Primary Examiner*—Shep K. Rose
*Attorney, Agent, or Firm*—Curtis, Morris & Safford

[57] ABSTRACT

Process for the manufacture of an orally administrable, delayed-action drug dosage form having the form of small globules which are provided with a release-delaying coating, wherein the active substance is applied onto small inert, essentially round globules, the globules so coated are provided with a release-delaying coating which is suitable as dialysis membrane and which contains as film former polyvinyl acetate, preferably in admixture with ethyl cellulose, and filling the globules so obtained in dosage units.

6 Claims, No Drawings

ORALLY ADMINISTRABLE DRUG DOSAGE FORM HAVING DELAYED ACTION

It is known to apply medicinal preparations by means of an adhesive liquid onto small inert carrier globules which consist essentially of sugar, lactose and maize starch (spray beads, nonpareil seeds, spherical pellets).

Since in these drug dosage forms, the active ingredient is directly exposed to the action of the digestive fluids, they do not permit prolonged, controlled release of the active ingredient.

It is also known to coat active-ingredient-containing tablets, granules or globules with protective coatings which resist the gastric fluid and are dissolved but in the intestinal tract only. Although these coatings allow timely delay of the release of the active ingredient, they do not permit continuous release, so that resorption rate and release of active ingredient are not tuned.

Another disadvantage of these coatings which are resistant to the gastric fluid is that they are dissolved only within a determined pH-range and that, in consequence thereof, the release of active ingredient is dependent on the occuring different physiological conditions.

The attempt has also been made to obtain release of the active ingredient in small equal doses from medicinal preparations over a prolonged period of time with cores obtained by a process likewise known, wherein small cores containing the active ingredient are coated with various, release-delaying layers of different thickness.

Besides the high expenditure involved in this process which requires preparation and mixing of differently coated core fractions, also in this case the objection is valid that the delaying effect is dependent upon the physiological conditions (pH-value, composition of enzymes) of the gastro-intestinal tract.

Now, we have found that an orally administrable drug dosage form having a delayed action, and which does not have the above-described disadvantages, can be obtained by applying the active ingredient onto small inert, essentially round carrier globules, and providing the globules so coated with a release-delaying layer suitable as a dialysis membrane and containing, as film former, polyvinyl acetate, preferably in admixture with ethyl cellulose, and encapsulating the globules so obtained to form a dosage unit.

As polyvinyl acetate types there may be used those having k-values (determined according to Fikentscher, Cellulosechemie 13 (1932), page 18) of about 20 to 90, preferably about 70 to 90. If the polyvinyl acetate is used in combination with ethyl cellulose, it is preferred to use a polyvinyl acetate having a k-value of between about 20 and 40, preferably about 30.

As ethyl cellulose, an ethyl cellulose having an ethoxyl content of about 44 to 49.9 is suitable. Within this range, there may be used, according to the invention, in particular those ethyl celluloses which have an ethoxyl content of from 45 to 46.5 and from 48 to 49.5. The viscosity of these ethyl celluloses is in general in the range of between about 7 and 100 cps. These ethyl celluloses are in general well suited for being used in combinations with polyvinyl acetate. Especially suitable for such a mixture is an ethyl cellulose having an ethoxyl content of about 48 – 49.5 percent.

If both film formers are used in a mixture, it is suitable to use them in a weight proportion of 3 parts of polyvinyl acetate and 0.5 to 2 parts of ethyl cellulose. Particularly suitable is a mixing ratio of about 3 parts of polyvinyl acetate and about 1 part of ethyl cellulose.

The film-forming layer may furthermore contain the usual auxiliary agents such as plastifiers, surface-active and colouring agents. As plastifiers there are particularly suitable the generally known plastifiers of the series of esters of phthalic acid, phosphoric acid, citric acid and glyceric acid. Triethyl citrate is preferably used. As surface-active agents there may be used the compounds known for this purpose, for example polyethylene glycol sorbitane fatty acid or salts of dioctylsulfosuccinic acid. Dioctylsodium-sulfosuccinate is preferably used. The films may be coloured with non-toxic lakes and pigments. For adjusting the depth of the colour, titanium dioxide may be used.

As solvents for the coating, there may be used low-boiling organic solvents which are suitable for dissolving the film-former, in particular, for example, chlorinated hydrocarbons. Methylene chloride has proved especially suitable. After previous swelling the film-formers are dissolved in the solvent and the lacquer auxiliary agents such, for example as plastifiers, surface-active agents, lakes and pigments, are added to this solution. After having been ground in a ball mill with porcelain balls or in a pearl mill, the lacquer so obtained is ready for use.

For dissolving the film-forming agents, combinations of solvents may also be used.

As regards the active ingredients, there are not limitations. The only condition is that they should be able to diffuse to a sufficient degree through the coating which serves as dialysis membrane.

The orally administrable drug dosage forms of the present invention are prepared in three stages;

a. application of the active ingredient to the carrier globules;

b. coating of the globules containing the medicinal preparation with the dialysis membrane;

c. filling into dosage units.

These three phases may be carried out as follows:

As carriers for the medicinal preparation, there may be used, for example, the small sugar globules used in homeopathy (homeopathic sugar globules) or the spray beads of sugar, lactose and maize starch (Nonpareilles) used in the sugar industry. In general they are round and have a diameter in the range of from about 0.1 to 2 mm, preferably about 1 mm. These globules are coated uniformly in a rotating coating pan with the coating solutions usually used in the manufacture of sugar-coated tablets or pills. Particularly suitable for wetting are adhesive solutions which consist of saccharose, gelatin and distilled water and which may also contain, for example starch sirup.

When the carrier globules have been wetted uniformly, finely pulverized pharmaceutically active substance is added in such a manner that it is just adhering to the surface of the globules. The globules are then dried with blast air; if necessary, the above-described process steps are repeated until the total amount of medicinal substance is applied.

In order to obtain a uniform distribution, active ingredients which are to be administered in low doses (up to about 150 mg) and for which the process of the invention is particularly suitable, may be blended, if desired, with the auxiliary agents usually employed for sugar-coated tablets or pills, for example calcium carbonate, powdered sugar, talc or gum arabic.

It is also possible to dissolve or to suspend the active substance in the adhesive liquid and to apply this liquid uniformly to the surface of the globules.

The lacquer which forms the dialysis membrane is sprayed in finely distributed form with the aid of a spray apparatus onto the surface of the globules which contain the active substance. The distance between spray nozzle and globules must be such that the solvent vaporizes at the moment when it reaches the surface. In this manner a continuous application is possible without the globules sticking together. An intermediate drying with hot blast air is not necessary, in contradistinction to the known processes. In the final phase it is suitable to spray talc over the globules. The thickness of the coating layer is in general between 20 to 100 $\mu$. It can be varied largely above or below the afore-said values, since for the release of the active ingredient this thickness is an essential factor.

The globules coated with active ingredient and dialysis membrane are then made up into dosage units. They are suitably filled into capsules, preferably into hard gelatin capsules.

The release of the active ingredient from the globules is based on the principle of protracted diffusion of the medicinal substance through the enveloping semi-permeable membrane. The fluid of the gastro-intestinal tract diffuses through the dialysis membrane into the micro-capsules and produces a concentrated solution of active ingredient which is continuously replenished until the active substance is consumed. The dissolved active ingredient diffuses then in protracted manner through the membrane into the gastro-intestinal tract.

The globules prepared according to the process of the invention and the process itself have essential advantages compared to the state of the art. Some of these advantages are explained hereafter:

For obtaining the required rate of release, it is not necessary to prepare by various methods different bead fractions and to mix them, as is the case for example with the preparations manufactured according to the state of the art; here, uniform charges are filled into gelatin capsules. The fluid of the gastro-intestinal tract penetrates through the dialysis membrane into the micro capsule and produces a concentrated solution of the active ingredient. The active ingredient does not diffuse then in portions, as is the case with the known multi-layer dragees, but it diffuses continuously through the membrane according to the osmose principle. Thus, in contradistinction to lacquered preparations which are resistant to gastric fluid and whose protective layer is dissolved in the alkaline intestinal fluid or in contradistinction to other preparations obtained according to the state of the art and in which the release of active ingredient depends on the enzymatic dissociation of lipophilic protective layers, the release mechanism is here independent from the individually different pH-and enzyme-conditions. The rate of release can be controlled by variation of the thickness of the film, or if a combination of film-formers is used, also by variation of the weight proportion of both film formers to each other. The release of active ingredient is slowed down when the proportion of polyvinyl acetate to ethyl cellulose is increased. A higher thickness of the film also reduces the speed of diffusion of the active ingredient. Furthermore, the molecular size and the solubility of the active ingredient, too, have an influence on the speed of diffusion. The speed of diffusion is proportional to the surface of diffusion. Thus, the rate of release of active ingredient, calculated on the dosage unit, can also be controlled by variation of the size of the carrier globules.

Furthermore, the globules of the invention can be prepared in a simple and rapid manner. In contradistinction to known processes, no intermediate drying of the coating is necessary. A further advantage is that the stability of medicinal substances which are unstable to heat and which, if hot blast air is used, undergo a loss of content, is not influenced. The granulation and compression processes which have an influence on the release of the active ingredient are not required. Since the active ingredient is distributed on a great number of micro-globules, there occur in vivo smaller variations in the release, in contradistinction to those occurring with medicinal preparations containing the active ingredient in a tablet or a sugar-coated tablet or pill.

Since in general there is an incompatibility between polyvinyl acetate and ethyl cellulose, it was not to be expected that this film forming combination would be suitable as protective coating layer for globules which contain a medicinal substance and would in this manner effect delayed release of the active ingredient.

The following examples illustrate the invention:

EXAMPLE 1:

2 Kg of homeopathic sugar globules (Non pareil seeds having an average diameter of about 1 mm were uniformly wetted in a rotating coating pan with an adhesive solution of the following composition:

| | |
|---|---|
| saccharose | 1,000 kg |
| gelatin | 0.050 kg |
| starch sirup. | 0.375 kg |
| distilled water | 0.500 kg |

A solution having the same composition, but no starch sirup, could also be used.

The adhesive solution and the active ingredient were applied as follows:

Such a quantity of the 400 g of finely pulverized 1-phenyl-1-(2-pyridyl)-3-dimethylaminopropane-hydrogeno-maleinate to be applied was added to the globules, which had beem wetted uniformly with about 10 ml of the adhesive solution, until the globules, which were sticking together were freely rolling again (per application, about 40 – 50 g of active substance were sufficient). Then, about the same quantity of talc was added, so that it just adhered to the surface of the globules. The globules were then dried with blast air. This process was so often repleated until the total amount of active substance to be applied was uniformly distributed on the surface of the globules.

For applying a total of 400 g of active substance, about 400 g of talc and about 100 ml of adhesive solution were necessary.

Then, 5 liters of the lacquer forming the dialysis membrane were sprayed in finely divided form by means of a spray apparatus onto the surface of the globules containing the active substance. The lacquer had the following composition:

| | |
|---|---|
| polyvinyl acetate, k-value (Molwilith 30) | 30 g |
| ethylcellulose (Ethocel Standard 50 cps of | |

-Continued

| | |
|---|---|
| Messrs. Dow), ethoxy content = 48 – 49.5 | 10 g |
| citric acid triethyl ester (Citroflex (R)² of Messrs. Pfizer) | 5 g |
| dioctyl sodium sulfosuccinate | 0.5 g |
| Red lake Z LT 1 (Messrs. Siegle) | 3 g |
| titanium dioxide | 4 g |
| methylene chloride ad | 1000 ml |

When spraying, the distance between spray nozzle and globules was so that the methylene chloride vaporized at the moment when it reached the surface of the globules.

The globules were then filled into gelatin capsules having the size 0, corresponding to a content of active ingredient of 67 mg.

It was found that with samples stored for 6 weeks at 40°C and 60°C, there occurred practically no change in the release of active ingredient in comparison to that observed with not stored samples. The stored samples showed a release which was increased insignificantly only. The outer appearance of the globules or capsules, too, had not changed after this period of time.

EXAMPLE 2.

A total of 400 g of finely pulverized 1-(2-phenylethyl)-biguanide hydrochloride, about 400 g of talc and about 100 ml of the adhesive solution described in Example 1 were applied uniformly in the manner described in Example 1 onto 2 kg of homeopathic sugar globules having an average diameter of about 1 mm.

The spraying-on of the lacquer, the consumption of lacquer and the composition of the lacquer corresponded to the indications given in Example 1. Instead of the dyestuff mentioned in Example 1, 1000 ml of lacquer contained 3 g of Orange Lake Z LT 1 (Messrs. Siegle).

The globules containing the active substance and provided with a dialysis membrane were filled into gelatin capsules having the size 0, corresponding to a content of active substance of 65 mg.

The properties of this drug dosage form with regard to release of active ingredient corresponded to those of the drug dosage form prepared according to Example 1.

EXAMPLE 3:

400 g of finely pulverized coffein, about 400 g of talc and about 100 ml of the adhesive solution described in Example 1 were applied uniformly in the manner described in Example 1 onto 2 kg of Nonpareilles having an average diameter of about 1 mm.

The spraying-on of the lacquer, the consumption of lacquer and the composition of the lacquer corresponded to the indications given in Example 1. Instead of the dyestuff mentioned in Example 1, 1000 ml of lacquer contained 3 g of Yellow Lake ZLT 3 (Messrs. Siegle).

The globules containing the active ingredient and provided with a dialysis membrane were filled into gelatin capsules having the size 1, corresponding to a content of active ingredient of 70 mg.

EXAMPLE 4:

400 g of finely pulverized 7-($\beta$-hydroxypropyl)-theophyllin, about 400 g of talc and about 100 ml of the adhesive solution described in Example 1 were applied in the manner indicated in Example 1 onto 2 kg of non pareil seeds having an average diameter of about 1 mm.

The spraying-on of the lacquer, the consumption of lacquer and the composition of the lacquer corresponded to the indications given in Example 1. Instead of the dyestuff mentioned in Example 1, 100 ml of lacquer contained 3 g of Blue Lake ZLT 2 (Messrs. Siegle).

The globules containing the active substance and provided with a dialysis membrane were filled into gelatin capsules having the size 1, corresponding to a content of active ingredient of 70 mg.

EXAMPLE 5:

400 g of finely pulverized 1-ephedrinium chloride, about 400 g of talc and about 100 ml of the adhesive solution described in Example 1 were applied uniformly in the manner indicated in Example 1 onto 2 kg of non pareil seeds having an average diameter of about 1 mm.

The spraying-on of the lacquer, the consumption of lacquer and the composition of the lacquer corresponded to the indications given in Example 1. Instead of the dyestuff mentioned in Example 1, 1000 ml of lacquer contained 3 g of Orange Lake ZLT 2 (Messrs. Siegle).

The globules containing the active substance and provided with a dialysis membrane were filled into gelatin capsules having the size 1, corresponding to a content of active substance of 75 mg.

What we claim is:

1. An orally-administrable delayed-action dosage unit form consisting essentially of a plurality of small round globules, 0.1 to 2 mm in diameter, each of said globules in turn consisting essentially of a single therapeutically inert carrier core which is a spherical pellet, non-pareil seed, homeopathic sugar globule, or spray bead, a single layer of therapeutically active material applied thereto and surrounding said core, and a single polymer release-delaying dialysis-membrane coating, 20 to 100 microns thick, surrounding said single therapeutic layer surrounding said core, said polymer coating being insoluble in, but permeable to, fluids in the gastrointestinal tract and consisting essentially of a mixture of polyvinyl acetate and ethyl cellulose in a weight proportion of 3:0.5 – 2 with the release of active ingredient being slowed down when the proportion of polyvinyl acetate to ethyl cellulose is increased, said polyvinyl acetate having a k-value between 20 and 90 and said ethyl cellulose having an ethoxy content between 44 and 49.5 and a viscosity between about 7 and 100 centipoises.

2. A dosage unit from as in claim 1 wherein said polyvinyl acetate has a K-value between 20 and 40.

3. A dosage unit form as in claim 1 wherein said ethyl cellulose has an ethoxyl content between 45 and 46.5.

4. A dosage unit form as in claim 1 wherein said ethyl cellulose has an ethoxy content between 48 and 49.5.

5. A dosage unit form as in claim 3 wherein said ethyl cellulose has a viscosity of 50 centipoises.

6. A dosage unit form as in claim 1 wherein said polymer coating consists essentially of polyvinyl acetate and ethyl cellulose in a weight proportion of 3:1.

* * * * *